Dec. 7, 1965 D. M. HUSTED 3,222,502

SYNCHRONISM FOR PUNCHED CARD READING SYSTEM

Filed May 8, 1961 2 Sheets-Sheet 1

DONALD M. HUSTED

INVENTOR.

BY D. Carl Richards

SYNCHRONISM FOR PUNCHED CARD READING SYSTEM

Filed May 8, 1961 2 Sheets-Sheet 2

DONALD M. HUSTED
INVENTOR.

BY D. Carl Richards 3,222,502
SYNCHRONISM FOR PUNCHED CARD READING SYSTEM

Donald M. Husted, Dallas, Tex., assignor, by mesne assignments, to Sperry Rand Corporation, Manhattan, N.Y., a corporation of Delaware Filed May 8, 1961, Ser. No. 108,537
10 Claims. (Cl. 235—61.11)

This invention relates to a card-reading system and more particularly to a system for providing synchronous control at any one of a plurality of card locations within the system.

In systems adapted to sense the position of a hole at any one of a multiplicity of locations in a card the two dimensions of the location of a hole are employed as a key to the magnitude of a given function represented by a hole location. In such systems it is necessary to synchronize the reading mechanism and the card-positioning mechanism preferably such that during the reading cycle the card is at rest. Generally, information cards are in the form of rectangular cardboard sheets. Each card is divided into a plurality of columns spaced along the length thereof. Across the card width each column is divided into a predetermined number of regions in any one of which a hole may be punched depending upon the information to be recorded.

In a typical example eighty information columns are provided in a card and each column is divided into twelve uniformly spaced locations at any one of which a hole may be formed. Such a card when placed in a reading system is advanced step-wise so that each of the information columns will come into registration sequentially with a column of sensors which, if a hole is present at a given location, will detect the same. In one form a feeler or finger extends through the hole and closes an electrical circuit which is a key to the information represented by the hole location.

The present invention is directed particularly to a system for providing synchronous control which may be selectively operative at any predetermined card location. More specifically, there is provided for the production of a control function upon registration of a columnar reader with any one of the card information columns or with any half-space or point intermediate adjacent card information columns.

More particularly in accordance with the present invention there is provided synchronous control means for a card-reading mechanism which includes the combination of structure forming a card way with a drive element extending into the way for moving a card through the way in predetermined steps. An electrical control unit driven in synchronism with movement of the drive element is provided together with means responsive to movement of the control unit to a position representative of any step or half-step position of the drive element for selectively producing control functions.

In a more specific aspect there is provided a synchronous control system for a card-reading mechanism having a columnar reader adjacent a way or slot which receives a card having a plurality of columnar information zones. Spaced perforations in any one of the zones are to be sensed by the reader as the zones are moved in sequence past the reader. There is provided a drive element extending into the way for engaging the trailing end of a card together with a driving means for moving the driving element step-wise. In a preferred embodiment, a disk is mounted for rotation in synchronism with movement of the drive element through the way and is provided with radially directed circumferentially spaced electrical contact zones in number at least equal to the number of card information spaces utilized. A conductive ring on the disk is connected to all contact zones except selected ones thereof which positionally correspond with control positions of the drive element. A circuit including frictional contacts is mounted successively to engage all of the contact zones on the disk as the drive element travels through the card way. Means are provided responsive to the changes in state effected in said circuit when said frictional contacts engage each of the said selected ones of said contact zones to produce control functions synchronized with control positions of the drive element.

In a more specific aspect, a commutator disk is coupled mechanically to a card-stepping system for synchronous movement between a card and the disk.

In a further aspect the invention relates to a mechanically coupled card drive and commutator in which the commutator is operatively associated with two sets of brushes and has two sets of commutator segments oriented circumferentially about an axis of rotation and in number at least equal to the number of card information zones utilized. In the preferred embodiment the commutator segments representative of any two adjacent card information columns are located in different commutator sets.

For a more complete understanding of the present invention and for further objects and advantages thereof, reference may now be had to the following description taken in conjunction with the accompanying drawings in which.

Figures 1, 2:
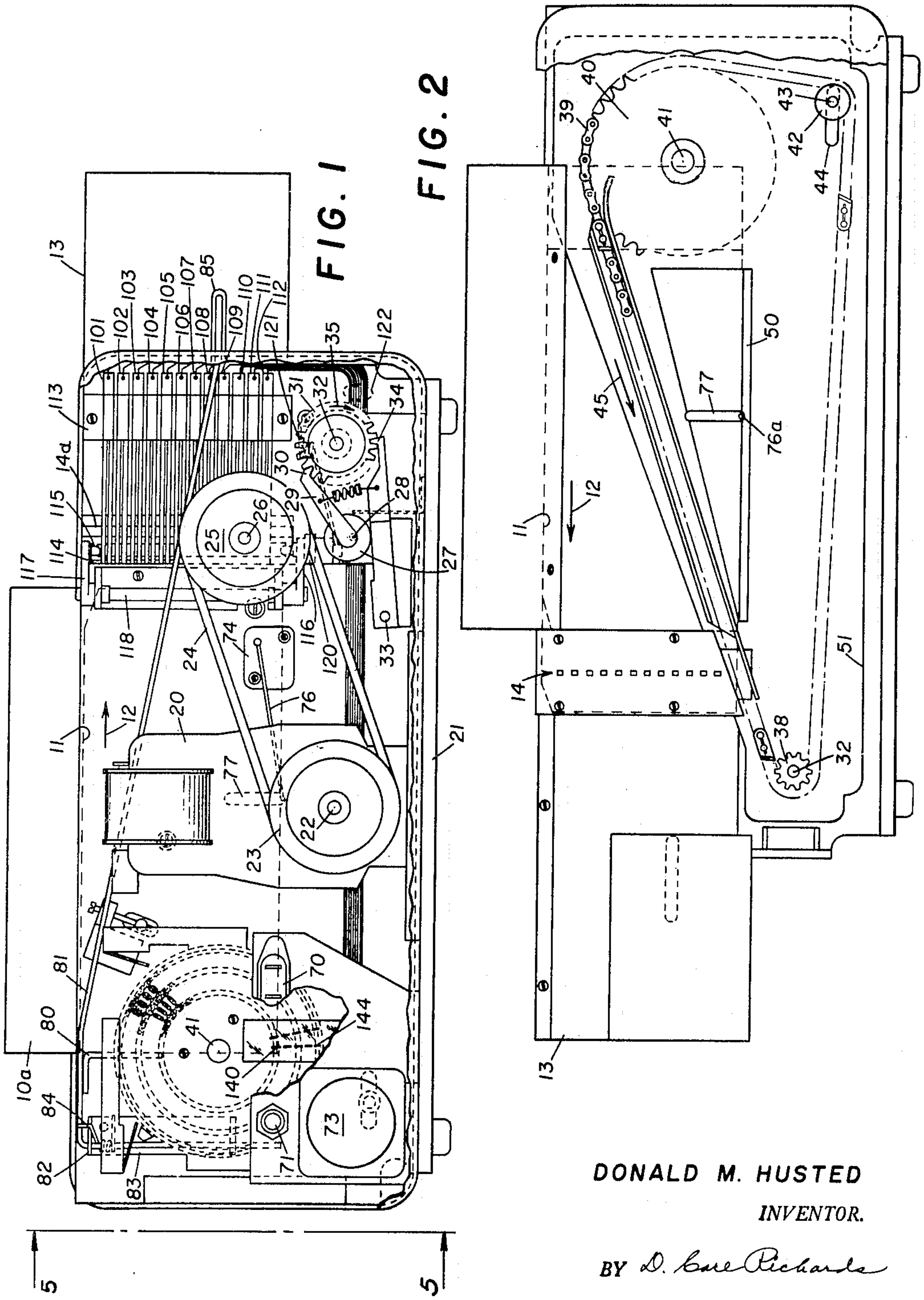
FIG. 1 is a front elevation view of the present invention.
FIG. 2 is a sectional view taken through the card-carrying slot along lines 2—2 of FIG. 5.
Figures 5, 6:
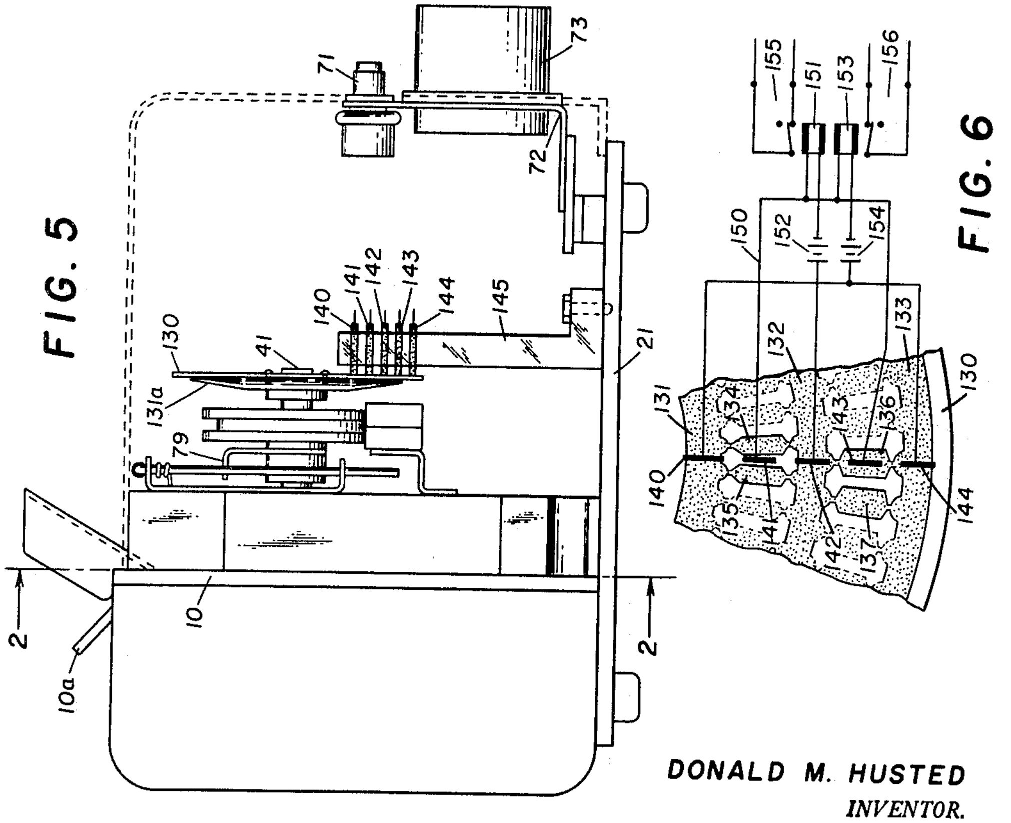
FIG. 5 is an end view of the card-reading system taken along the lines 5—5 of FIG. 1.
FIG. 6 is an enlarged view of a portion of the control mechanism of FIG. 1.

Referring to FIGS. 1, 2 and 5, FIG. 1 illustrates a front view of a card-reading mechanism embodying the present invention, FIG. 2 a sectional view, and FIG. 5 an end view. A front cover is broken away so that the operating mechanism may be shown in FIG. 1. The mechanism controls the position and senses the information punched in a card placed therein. Punched cards are inserted one at a time into a card way or slot 10, FIG. 5, extending downwardly from the face of a guide plate 10*a* so that the card initially is positioned as indicated by the dotted outline 11, FIGS. 1 and 2. The card is to be moved stepwise in the direction of arrow 12. During the time intervals between steps, the presence or absence of a hole at a zone in each information column on the face of the card is sensed. Such information is transmitted from the card-reading mechanism to peripheral utilization units (not shown) and may also be employed to control the card reader itself.

For the purpose of the present invention it will be assumed that the card 11 will be moved through the slot and into a holder 13 in equal steps. Provision is made for accurately aligning the card at the end of each step with a column of reading figures which extend through slots located in a columnar reader 14 located along a line 14a. Such fingers may transversely penetrate the slot 10. In FIG. 2 the position of the card 11 is shown at the point of entry with the leading edge thereof approaching reader 14. The ends of the two fingers extend into each of the slots along line 14a which are adapted to be moved therethrough to engage the face of the card 11 or to extend through a hole punched at a given card location, as the case may be.

The invention will now be described primarily with respect to three cooperative functions. The first relates primarily to the card drive. The second relates primarily to card reading. The third relates primarily to synchronized control.

CARD DRIVE

A motor unit 20, FIG. 1, is mounted on a base plate 21. The motor unit 20 is a fractional horsepower induction motor adapted to provide a uniform output speed. Mechanical power from motor 20 as on shaft 22 is coupled by way of a pulley 23 and a belt 24 to a drive pulley 25. Pulley 25 is mounted on shaft 26. Shaft 26 is coupled to a shaft (not shown) extending parallel thereto and positioned therebelow. Rotational motion of shaft 26 is applied to a cam 27 by way of a shaft which has its axis at point 28. Cam 27 is adapted to move a ratchet crank arm 29. Crank arm 29 has a pawl 30 at the end thereof which engages the teeth of a sprocket gear 31. The sprocket gear 31 is mounted on shaft 32 which is parallel to shaft 26 and to the axis 28. A second arm 34 is pivoted on a shaft 33 and has a pawl at the end thereof which engages the teeth of the gear 31. Rotation of the cam 27 serves to actuate the crank arm 29 so that the ratchet wheel 31 is moved step-wise in the direction of arrow 35. As the crank arm 29 steps from one tooth back to another preparatory to stepping the ratchet gear 31 ahead, the cam 27 permits the arm 32 to be urged into engagement with the ratchet gears at the bottom thereof under the control of the force developed by a spring 36 which interconnects the crank arm 29 and the crank arm 32. Thus shaft 32 is driven in an intermittent rotational motion under the uniform drive provided by motor 20.

The stepped motion developed on shaft 32 is utilized to drive the card 11 from the input location to an output location as shown in FIG. 2. The shaft 32 extends through the wall 75 in which the row of reading slots 14 is formed. On the side of the wall 75 opposite the gear 31 a sprocket wheel 38 is mounted on shaft 32. A sprocket chain 39 is supported over and driven by the sprocket wheel 38. The chain 39 extends over a large sprocket wheel 40 which is mounted on a shaft 41. The chain 39 also extends over an idler sprocket 42 which is mounted on a shaft 43. The shaft 43 may be adjustably positioned in a slot 44. Thus the chain 39 traveling in the direction of arrow 45 traverses the length of the slot in which the card is placed along an angular path which is determined by the relative diameters of the sprocket wheels 38 and 40 and the positions of the shafts 32 and 41, respectively.

The slot 10 in which card 11 is positioned has a fixed bottom plate 50 on which the lower edge of the card 11 rests as it is moved along the length of the slot 10. The sprockets 38, 40 and 42 are mounted in a recess whose outline is indicated by the reference character 51. The outer face of the sprockets 38, 40 and 42 is positioned closely adjacent the boundary of slot 10 and is but slightly recessed so that no contact is made by the sprocket wheel 40 or by the sprocket chain 39. The chain 39 is provided with a plurality of spaced pins. Preferably the chain is a flat link chain having parallel bars at opposite sides of the sprockets with bearing pins extending therebetween. The pins carry sleeves which serve to space the side bars and which seat in the troughs of the sprocket wheels. Selected ones of the pins extending through the linkages and carrying bearing sleeves are so designed that card-engaging elements may be mounted at a plurality of points along the length of the chain.

Figure 3:
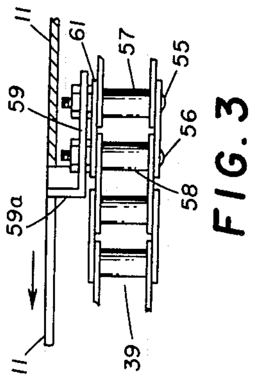
FIG. 3 is an enlarged view of a section of the card-propelling chain.
Figure 4:
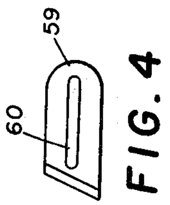
FIG. 4 is an enlarged view of a card-engaging element.

In a preferred embodiment of the invention the card-engaging element 59, FIG. 3, is formed from an angle member and is mounted on bolts 55 and 56. The bolts 55 and 56 replace a pair of adjacent pins and extend through adjacent bearing sleeves 57 and 58. Bolts 55 and 56 are provided with threaded ends which pass through the member 59. As shown in FIG. 4, the member 59 has a slot 60 extending substantially the entire length of the long side of the angle so that the bolts 55 and 56 extend through the same slot. The slot 60 is longer than the spacing between bolts 55 and 56 so that the card-engaging portion 59a may be shifted in its position relative to the chain 39. By this means, for a given position of chain 39, a precise alignment may be esablished as between the card 11, FIG. 2, and the columnar reader 14.

It is to be appreciated that while the zones in the card along which holes may be punched may be accurately positioned relative to one another, the step-wise movement of the card 11 may involve slight misalignment whereupon the reading fingers in the reader 14 will not carry out the reading function. Thus, adjustability of the member 59 along a carrier such as chain 39 having lateral rigidity has been found to be most desirable. The sprocket chain 39 provides the necessary rigidity by the use of the pins and bolts extending therethrough to maintain the card-engaging portion 59a fixed with respect to the chain.

It will be recognized that while two bolts 55 and 56 have been illustrated as engaging the member 59, a single bolt cooperating with a channel-type member 59 which would encompass the link 61 would be suitable and could be adjustable through the use of a slotted portion as illustrated in FIG. 4 without the necessity of using the two bolts. In either event applicant provides an accurate positioning system for the card 11 as it travels through the slot 10, FIG. 3.

Power for driving motor 20 is applied to the card-reading mechanism by way of a plug 70. Control of such power is effected by way of a push button switch 71 which is mounted on a bracket 72, shown partly broken away in FIG. 1. Bracket 72 also carries a multiterminal plug unit 73 which, as hereinafter described, is employed in connection with the reading functions of the machine.

In order to sense the presence of a card and to initiate stepping operations, a microswitch 74 is mounted on the central plate 75 which forms one wall of the slot 10. Switch 74 is actuated under the control of a lever 76 which has an extension penetrating into the card slot 10 by way of an elongated opening 77 in the wall 75. In FIG. 2 the opening 77 with an extension 76a of lever 76 may be seen. When the card 11 is dropped into the slot 10, the lever 76 is moved down so that the extension 76a is positioned at the bottom of the opening 77. By this means there may be developed a control function through the closure of switch 74 which may be utilized in associated apparatus related to the card-reading mechanism to indicate that a card is in the slot and thereby conditions the associated apparatus for receiving data from the card.

Figure 7:
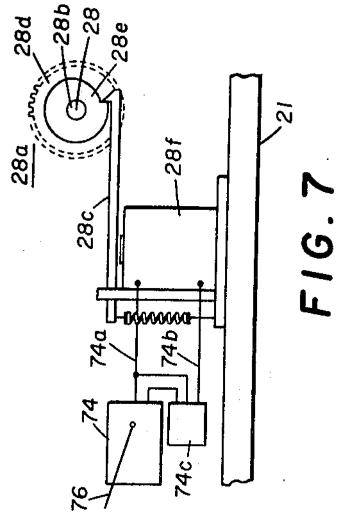
FIG. 7 is a detailed view showing a clutch control unit.

In a preferred embodiment of the invention, the linkage between the shaft 26 and the shaft 28b centered along axis 28 includes a clutch 28a which is shown in the detailed view of FIG. 7. Power is transmitted from the shaft 26 to the clutch 28a by means of a gear 28d. The motion of the gear is to be transmitted to shaft 28b through the clutch mechanism. A cam 28e is mounted on the shaft 28b and is frictionally coupled to the gear 28*d* by means not shown. The clutch 28*a* is controlled by a switch 74. When the switch 74 is open, that is with the arm 76 in the upper position, the clutch pawl 28*c* engages the cam 28*e* to lock the shaft 28*b* and prevent rotation thereof. When the switch 74 is energized with the arm 76 in the lower position, then the arm 28*c* is retracted to disengage it from the cam 28*e*. When this is done, the rotational motion introduced by way of the gear 28*d* is transmitted to the shaft 28*b* to initiate operation of the pawls 29 and 32 to step the sprocket gear 31. The circuit from the switch 74 is connected to the relay coil 28*f* by way of conductors 74*a* and 74*b* with current for operating the relay coil 28*f* being derived from a unit 74*c* which may include a current source and a timer or control means to maintain the clutch 28*a* energized until the card 11 has completed its journey through the machine.

The shaft 41 on which the sprocket 40 is mounted extends through a bearing (not shown) in the plate 75 and carries a cam unit 79, FIG. 5, which serves periodically to engage the arm 80 which is connected to an arm 81. Arm 81 is pivoted in a hinge structure 82 which is mounted on the plate 75. The downturned portion 83 extends through holes in the hinge 82 and is encompassed by a spring 84 which serves to bias the arm 81 towards the plate 75. The end of the arm 81 opposite the hinge 82 extends through a slot 85 and periodically is permitted to make a traverse through the slot 85 to move each card as it reaches the output location from a position in contact with the surface of plate 75 and aligned with slot 10 to a laterally spaced position in a card-receiving bin 13. The arm 81 moves under the resilient force developed by the spring 84 and is operative at the end of each cycle of card movement.

A given cycle for reading one card involves the following: A card 11 is dropped into the slot 10. This actuates the arm 76 to close switch 74. In response to switch 74 motion is applied from shaft 26 to the cam 27 which steps the sprocket 31 at uniform time intervals under the power from motor 20. Element 59 engages the trailing edge of the card 11 to move the same. At the end of each step as the successive zones on card 11 are moved into registration with the row of slots 14, FIG. 2, the presence or absence of a hole in the card 11 at any of the twelve positions is detected as will hereinafter be described. As the card 11 reaches an output location at the end of its traverse through the card reader, the arm 85 is actuated to move the card out of alignment with the slot 10 and into a card bin 13.

CARD READING

Illustrated in FIG. 1 are twelve bars 101–112 which are mounted cantilever-fashion in a block 113. The block 113 is mounted on the face of the plate 75 opposite the card-carrying slot 10. Each of the bars 101–112 is bifurcated and has two tines extending from the block 113 towards line 14*a* of card-reading slots. The ends of the bars 101–112 opposite the block 113 overlie a conductive bar 114. The bar 114 is connected to an electrical ground with the ends of the bars 101–112 mounted in the insulating block 113. A contact between any one of the tines of the bars 101–112 and the bar 114 will produce a signal in the circuit connected to a given bar. The bars 101–112 also overlie an insulating control rod 115 which is operated by a pair of crank arms 116 and 117. The crank arms 116 and 117 are operated in the interval between the steps taken by card 11 so that the ends of the bars 101–112 will be lowered towards the contact bar 114.

Under each of the tines of the bars 101–112 there is provided a pair of fingers which extend through the slots along the line 14*a*, FIG. 2. The passage of either of the two fingers through a given slot in a card will permit one of the tines to be lowered into contact with the bar 114. The bars 101–112 are resilient and tend to urge the fingers through the slots in row 14 and against the surface of a card when the crank arms 116 and 117 are actuated.

It will be noted that the crank arms 116 and 117 are mounted on a shaft 118. The lower crank arm 116 carries a cam-engaging roller 120. A spring 121 is locked under an end of the crank arm and tends to urge the crank arms away from the plate 75 thus maintaining the bars 101–112 from engaging the fingers extending through the slots. A cam (not shown) carried by the shaft 28*b* on axis 28 is actuated once for each step of the crank arm 29 to lower the bars 101–112 onto the respective fingers. Electrical circuits extend from each of the bars 101–112 to plug 73 as indicated by the cable 122. Output signals are thus provided which are keyed to the two dimensions of the location of a given hole in card 11.

SYNCHRONIZED CONTROL

Referring again to FIGS. 1, 5 and 6, it will be seen that the shaft 41 carries a disk 130 on which there is deposited a conductive sheath suitably formed to serve as a commutator. As best shown in the enlarged view of FIG. 6, a section of the commutator includes an inner ring 131, a central ring 132 and an outer ring 133. Rings 131 and 132 are connected together electrically as by segments 134 and 135. Similarly, the rings 132 and 133 are connected together by spaced segments 136 and 137. The spacing between adjacent segments such as segments 134 and 135 is of the order of twice the angular motion of shaft 41 for the movement of card 11 through one step. A similar spacing is provided as between the segments 136 and 137. It will be noted that the segments 134 and 135 are staggered with respect to segments 136 and 137. Thus, there is one segment for each step of the card 11. A first set of brushes is provided for making electrical contact with the rings and intermediate segments. As indicated in FIG. 5, the brushes 140–144 are mounted in an insulating standard 145 which is fastened to the base plate 21. As seen in FIG. 6, brush 140 maintains a continuous contact with the inner ring 131. The brush 141 is adapted to contact each of the segments 134, 135, etc. Brush 142 maintains a continuous contact with the central rings 132; the brush 143 is adapted to contact each of the segments 136, 137; and brush 144 maintains continuous contact with the outer ring 133. The segments 134, 135, 136 and 137 are so dimensioned and are located so that either brush 140 or brush 143 always will be in contact with one of the segments. That is to say, brush 140 will not move from a segment onto an insulating section of the disk 130 before the brush 143 moves from an insulating segment to one of the conductive segments. The location of each of the segments such as segments 134–137 corresponds with the location on the card 11 of a card information column. Thus there is one segment in the commutator for each card column.

Punched cards are provided in one standardized form having dimensions 7⅜″ long, 3¼″ wide and 0.0065″ thick. Various makes of cards employ different numbers of information columns. The actual card may be between 86 and 87 columns in length but a lesser number of columns is actually used. In any case there would be provided segments in number sufficient in total to equal the length of the card so that one rotation of the disk 30 corresponds with the movement of a card from one end to the other past the line 14*a*. The brush 141 is connected by way of a conductor 150 to one terminal of a relay 151 and to brush 143. The second terminal of relay 151 is connected by way of a battery 152 to the brush 142. Conductor 150 is also connected to one input of a second relay 153. The second terminal of relay 153 is connected by way of battery 154 to each of the brushes 140 and 144. Relay 151 is provided with an output circuit 155 which is either opened or closed depending upon the condition of the commutator disk 130. The relay 153 has an output circuit 156 which may similarly be conditioned.

In operation, it is desired to produce a control function in the output circuit 155 corresponding with the card location represented by the segment 136. The segment 136 would be isolated from the adjacent rings 132 and 133 by the removal of end-portions of the segment 136. The segments are provided with zones of reduced width so that they may be conveniently removed. When this is the case and when the disk 130 is positioned relative to the brushes 140–144 as illustrated in FIG. 6, the circuit from both batteries 152 and 154 is broken so that the switches in circuits 155 and 156 will be opened, thereby to produce an output function which may be utilized for operation of the card-reading mechanism or for associated system components. However, as long as the segments 134–137 and additional segments in each of the two rings of segments are unaltered, current will continue to flow in the relays 151 and 153 to maintain the circuits closed.

The commutator may be programed for various modes of operation by the selection of segments at which a control function is to be produced. It is to be understood that it may be desirable to produce a control function when a given card information column is centered on the line 14a or it may be desired to produce a control function in a half-column space, that is, when adjacent card information columns are half-way between registration with the line 14a. When this is the case, a second set of brushes such as the brushes 160–164 will be provided with the spacing thereof relative to the brushes 140–144 equal to a whole number of spacings between adjacent segments plus one half space. A set of circuits operative under the control of the brushes 140–144 may thus be employed for additional control purposes.

It will be understood that the commutator may consist only of two rows of segments connected to the central ring 132. When such construction is employed, the control functions above described could be carried out. However, it has been found desirable to utilize the three rings, 131, 132 and 133, in order to provide flexibility in selecting the programs which will be employed through the use of the commutator.

Furthermore, it will be understood that a pair of rings such as rings 131 and 132 could be employed with a single ring of commutator elements such as the elements 134 and 135 where commutator elements in number equal to the number of spacings on the card would be provided. However, in order to conserve space and still permit utilization of components of workable dimension, two rows of commutator segments together with three commutator rings have been employed in a preferred embodiment of the invention.

The movement of the commutator disk 130 is synchronized, moving step-wise along with the ratchet wheel 40 so that the position of the disk 130 corresponds step-for-step with the movement of the card 11 through the slot 10. At any point of registration between the line 14a and the card 11 a control function may be produced which is accurately synchronized both as to space or time with the card itself.

Referring again to FIG. 5, it will be noted that the disk 130 is mounted on shaft 41 by means of a hub plate 131a. The disk 130 is formed from a disk of an insulating material such as a phenolic or epoxy resin or the like. From such disk all copper except the desired conductive commutating segments are removed by photo-etching process. Following this, a nickel plating or a rhodium plating is flashed onto the copper elements.

The brushes 140–144 may be of material such as beryllium copper either in a solid or brush form to maintain contacts with the conductive elements on the plates 130a.

The following functions are representative of uses of the commutator:

(1) The machine may be started and stopped at any card position in response to the commutator;

(2) The commutator may serve to shift an associated typewriter carriage or to change from lower to upper case type;

(3) The commutator may control the reading operations or may provide for the discontinuance of reading operations at any card position.

From the foregoing it will be seen that there is provided a synchronous system in which a control function may selectively be produced at a time corresponding with the movement into registration with a columnar reader of any card information column or any half space between such columns.

Having described the invention in connection with certain specific embodiments thereof, it is to be understood that further modifications may now suggest themselves to those skilled in the art and it is intended to cover such modifications as fall within the scope of the appended claims.

What is claimed is:

1. In a card reading system the combination which comprises:

(a) structure forming a card way, (b) drive means for successively engaging each card placed in said way and for moving each said card therethrough in steps, (c) a commutator rotated in synchronism with said drive means, (d) a set of spaced contacts and brush means in said commutator relatively movable one with respect to the other into open circuit relation at each position corresponding with the terminus of each step of said card and into closed circuit relation at each half step position, and (e) a control circuit having one terminal connected to said brush means and the other terminal connected to all except a selected fraction of said spaced contacts for generating a control function at any half step position represented by said selected fraction of said contacts.

2. In a card reading system the combination which comprises:

(a) structure forming a card way, (b) drive means for engaging each card placed in said way and for moving each said card therethrough in steps, (c) a commutator rotated in synchronism with said drive means, (d) a first set of spaced contacts and brush means of said commutator having closed circuit relation at each position corresponding with the terminus of each step of said card and open circuit relation at each half step position, (e) a second set of spaced contacts and brush means of said commutator having closed circuit relation at each said half step position and open circuit relation at each said terminus, and (f) a control circuit having one terminal connected to both said brush means and the other terminal connected to all except a selected fraction of said spaced contacts for generating a control function at the respective terminus and half step positions represented by said selected fraction of said contacts.

3. In a card reading system the combination which comprises:

(a) structure forming a card way, (b) drive means for engaging each card placed in said way and for moving each said card therethrough in steps, (c) a commutator rotated in synchronism with said drive means, (d) a first set of spaced contacts and brush means of said commutator relatively movable into closed circuit relation at each position corresponding with the terminus of each step of said card and into open circuit relation at each half step position, (e) a second set of spaced contacts which partially overlap the contacts of said first set and second brush means of said commutator relatively movable into closed circuit relation at each said half step position and into open circuit relation at each said terminus, and (f) a control circuit having one terminal connected to both said brush means and the other terminal connected to all except a selected fraction of said spaced contacts for generating a control function at any terminus or half step position occupied by said selected fraction of said contacts.

4. In a card reading system the combination which comprises:

(a) structure forming a card way, (b) drive means for engaging each card placed in said way and for moving each said card therethrough in uniform steps, (c) a commutator disk rotated in synchronism with said drive means, (d) a first ring of spaced apart contacts on said disk and a first brush means in the commutator, said disk and said brush means being movable, relative to each other into closed circuit relation at each commutator position corresponding with the terminus of a step of said card and into open circuit relation at each half step position, (e) a second ring of spaced apart contacts on said disk and a second brush means in said commutator, one of said second ring and said second brush means being offset relative to said contacts of said first ring and said first brush means and movable one relative to the other into closed circuit relation at each said half step position and into open circuit relation at each said terminus, and (f) a control circuit connected at one terminal to both said brush means and the other terminal formed of a continuous conductive ring in said commutator connected to all except a selected fraction of said spaced contacts in both said first ring and said second ring for generating a control function at any terminus or half step position occupied by members of said selected fraction of said contacts.

5. In a card reading system the combination which comprises:

(a) structure forming a card way, (b) drive means for engaging each card placed in said way and for moving each said card therethrough in steps, (c) a commutator disk rotated in synchronism with said drive means and including thereon at least three concentric rings, the inner and outer rings having circumferentially spaced segments and the intermediate ring of continuous form and connected to selected ones of said segments, (d) first and second brushes mounted for sequential contact with said segments of said inner and outer rings, respectively, (e) a third brush mounted to contact said intermediate ring, and (f) a control circuit having one terminal connected to said first and second brushes and the other terminal connected to said third brush for generating a control function at any terminus or half step position occupied by said selected ones of said segments upon registration therewith by said first and second brushes.

6. In a card reading system the combination which comprises:

(a) structure forming a card way, (b) drive means for engaging each card placed in said way and for moving each said card therethrough in steps, (c) a commutator disk rotated in synchronism with said drive means and including thereon at least three concentric rings, the inner and outer rings having radially extending circumferentially spaced segments and the intermediate ring being continuous and connected to all but one or more selected control segments of said inner and outer rings.

(d) first and second brushes fixedly supported for contact with said segments of said inner and outer rings, respectively, (e) a third brush fixedly supported in contact with said intermediate ring, and (f) a control circuit having one terminal connected to said first and second brushes and the other terminal connected to said third brush for generating a control function at each terminus or half step position occupied by said one or more selected control segments.

7. The combination set forth in claim 6 in which the radial extensions of the edges of said segments on the inner and outer rings are in overlapping relation.

8. The combination set forth in claim 6 in which the segments of the inner and outer rings are connected to the intermediate ring by way of reduced neck portions readily severable for facilitating selection of sites for generation of each said control function.

9. In a card reading system the combination which comprises:

(a) structure forming a card way, (b) drive means for engaging each card placed in said way and for moving each said card therethrough in steps, (c) a commutator disk rotated in synchronism with said drive means and including thereon at least five concentric rings, the second and fourth rings having radially directed circumferentially spaced segments and the first, third and fifth rings being continuous in form and selectively connected to all but a selected fraction of said segments in said second and third rings, (d) five brushes, the second and fourth of which are mounted for contact with said segments of said second and fourth rings, respectively, and the first, third and fifth brushes mounted to contact said first, third and fifth rings, respectively, (e) a first control circuit having one terminal connected to said second and fourth brushes and the other terminal connected to one of said first, third and fifth brushes for generating a first control function at any terminus or half step position represented by the positions of said selected fraction of said segments, and (f) a second control circuit having one terminal connected to said second and fourth brushes and the other terminal connected to a different one of said first, third and fifth brushes for generating a second control function at any terminus or half step position represented by the positions of said selected fraction of said contacts.

10. In a card reading system the combination which comprises:

(a) structure forming a card way, (b) drive means for successively engaging cards placed in said way and for moving each said card therethrough in steps, (c) card reading means positioned along said way for sensing information stored on said card at a first point in each step cycle, (d) a commutator rotated in synchronism with said drive means, (e) a set of spaced contacts and brush means in said commutator relatively movable one with respect to the other into open circuit relation at each position corresponding with the terminus of each step of said card and into closed circuit relation at a second point in any said step cycle which second point is about at a half step position relative to said first point, and (f) a control circuit having one terminal connected to said brush means and the other terminal connected to all except a selected fraction of said spaced contacts for generating a control function at half step positions represented by said selected fraction of said contacts.

References Cited by the Examiner

UNITED STATES PATENTS

| | | | |
|---|---|---|---|
| 757,667 | 4/1904 | Mayall | 271—45 |
| 1,658,024 | 1/1928 | Bryce | 235—61.65 |
| 1,741,985 | 12/1929 | Ford | 209—110 |
| 1,926,882 | 9/1933 | Peirce | 235—61.65 |
| 1,987,322 | 1/1935 | Campbell | 235—61.65 |
| 2,067,157 | 1/1937 | Maul | 235—61.65 |
| 2,324,438 | 7/1943 | Thomas et al. | 235—61.62 |
| 2,401,021 | 5/1946 | Rosenberg | 235—61.61 |
| 2,772,051 | 11/1956 | Baldwin | 235—61.65 |
| 2,995,691 | 8/1961 | Kennard et al. | 235—61.11 |
| 3,063,627 | 11/1962 | Cronquist | 235—61.65 |

ROBERT C. BAILEY, *Primary Examiner.*

WALTER W. BURNS, JR, MALCOLM A. MORRISON, *Examiners.*